(12) United States Patent
Lee

(10) Patent No.: US 6,671,352 B1
(45) Date of Patent: Dec. 30, 2003

(54) AUTOMATIC VOICE ANNOUNCEMENT APPARATUS AND CONTROL METHOD THEREFOR

(75) Inventor: Dong-Ju Lee, Kumi-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/223,717

(22) Filed: Dec. 31, 1998

(30) Foreign Application Priority Data

Dec. 31, 1997 (KR) ........................................... 97-80552

(51) Int. Cl.[7] ............................................... H04M 1/64
(52) U.S. Cl. ..................... 379/67.1; 379/76; 379/88.17; 379/88.18; 379/88.22; 379/88.25
(58) Field of Search .............................. 379/79, 72, 73, 379/76, 78, 70, 88.07, 71, 88.22, 80, 265, 67.1, 88.17, 88.18, 88.25, 88.16

(56) References Cited

U.S. PATENT DOCUMENTS

| | | | | |
|---|---|---|---|---|
| 4,301,525 A | * | 11/1981 | Mohammadioun et al. ... | 369/29 |
| 4,625,081 A | * | 11/1986 | Lotito et al. ................... | 379/88 |
| 4,757,525 A | * | 7/1988 | Matthews et al. ............. | 379/88 |
| 4,955,051 A | * | 9/1990 | Sato ............................. | 379/75 |
| 5,400,393 A | * | 3/1995 | Knuth et al. ................... | 379/88 |
| 5,539,818 A | * | 7/1996 | Zdenek et al. ............... | 379/265 |
| 5,652,789 A | * | 7/1997 | Miner et al. ................. | 379/201 |
| 5,984,780 A | * | 11/1999 | Takemoto et al. ............ | 463/20 |
| 6,215,992 B1 | * | 4/2001 | Howell et al. .............. | 455/412 |

* cited by examiner

*Primary Examiner*—Allan Hoosain
(74) *Attorney, Agent, or Firm*—Robert E. Bushnell, Esq.

(57) ABSTRACT

An automatic voice announcement apparatus for sending an automatic voice announcement message to a subscriber connected to an exchange from the beginning of the message includes: a message receiving memory for receiving a voice message recording and playback commands from a high-level processor; a digital signal processor for receiving the commands from the message receiving memory, and for generating control signals for recording and playing back a voice message; a message controller for sequentially recording a voice message in corresponding areas in response to a voice message recording control signal from the digital signal processor, and for playing back the voice message from the beginning of the message by selecting a specific channel in response to a voice message playback control signal from the digital signal processor; and a voice memory having a plurality of cards to which channels are assigned, the voice message being stored in one of the channels.

4 Claims, 9 Drawing Sheets

AUTOMATIC VOICE ANNOUNCEMENT APPARATUS AND CONTROL METHOD THEREFOR

CLAIM OF PRIORITY

This application makes reference to, incorporates the same herein, and claims all benefits accruing under 35 U.S.C. §119 from an application for AUTOMATIC VOICE ANNOUNCEMENT APPARATUS AND CONTROL METHOD THEREFOR earlier filed in the Korean Industrial Property Office on the Dec. 31, 1997 and there duly assigned Ser. No. 80552/1997.

BACKGROUND OF THE INVENTION

1. Field of the Invention

The present invention relates to an automatic voice announcement apparatus for offering an automatic voice announcement message to a subscriber connected to an exchange, and more particularly, to an apparatus and method for sending an automatic voice announcement message to a subscriber from the beginning of the message.

2. Description of the Related Art

An exchange including an automatic voice announcement apparatus has an automatic voice announcement service function. Such an exchange automatically sends an announcement message to subscribers without an operator or other person answering a call. However, in an earlier automatic voice announcement apparatus, an announcement message is sent to a subscriber not from the beginning of the entire message but from the next part of the message which has been sent to a previous subscriber. Hence, the subscriber must listen to the message repeatedly in order to confirm the contents of the message.

Such an automatic voice announcement apparatus includes message memories, look-up counters connected respectively to the message memories, time-set circuits connected respectively to the look-up counters, a port controller connected to the message memories, a serial to parallel converter and a parallel to serial converter. The port controller controls the overall operation during the recording and playback of a voice message. The serial to parallel converter transmits voice data to the message memories so that the voice message can be sequentially recorded in the message memories under the control of the port controller. The parallel to serial converter transmits the voice data read from the message memories to a voice transmitter under the control of the port controller during the playback of the voice message.

If there is a voice message recording command from a high-level processor to the port controller, the port controller controls the ports of the message memories so that the voice data input through the serial to parallel converter can be sequentially recorded in the message memories. Then, the voice data input through the serial to parallel converter is recorded in the message memories. The look-up counter and the time-set circuit connected to the message memory to be recorded operate to count each address sequentially.

If there is a voice message playback command from the high-level processor to the port controller, the port controller plays back the voice data recorded in the message memory through the parallel to serial converter. The look-up counter counts the address of the message memory sequentially. During the playback of the voice message, the end point of the voice message which has been sent to the previous subscriber is stored in the time-set circuit. If a new subscriber is connected, the automatic voice announcement message beginning at the end point (end address) stored in the time-set circuit is sent to the new subscriber. If a partial message has been sent to a previous subscriber, the address of the beginning of the message is stored in the time-set circuit. If a new subscriber is connected, the voice message beginning from the middle of the message is played back. Therefore, the new subscriber must listen to the message once more in order to confirm the entire contents of the announcement message.

Thus, the automatic voice announcement apparatus plays back the automatic announcement message not from the beginning of the message but from the end point of the message which has been sent to a previous subscriber. Therefore, the subscriber must repeatedly listen to the message in order to confirm the contents of a complete message. Consequently, the time during which the subscriber is connected to the exchange is lengthened and thus the exchange is inefficiently managed.

SUMMARY OF THE INVENTION

It is therefore an object of the present invention to provide an automatic voice announcement apparatus which can send an automatic voice announcement message to subscribers from the beginning of the message and a control method therefor.

There is provided, in accordance with an aspect of the present invention, an automatic voice announcement apparatus including: a message receiving memory for receiving a voice message recording and playback commands from a high-level processor; a digital signal processor for receiving the commands from the message receiving memory, and for generating control signals for recording and playing back a voice message; a message controller for sequentially recording a voice message in corresponding areas in response to a voice message recording control signal from the digital signal processor, and for playing back the voice message from the beginning of the message by selecting a specific channel in response to a voice message playback control signal from the digital signal processor; and a voice memory having a plurality of cards to which channels are assigned, the voice message being stored in one of the plurality of channels.

There is provided, in accordance with another aspect of the present invention, a method for controlling an automatic voice announcement message in an automatic voice announcement apparatus of an exchange including a message receiving memory, a digital signal processor, a message controller, and a voice memory consisting of a plurality of channels. The method includes the steps of: applying voice message recording and playback command signals received from a high-level processor to the digital signal processor; generating voice message recording and playback control signals; recording a voice message in a specific channel of the voice memory in response to the voice message recording control signal; counting a recording time of the voice message and storing start and end points of the voice message; recording a plurality of voice messages in different channels of the voice memory and storing start and end points of the respective voice messages; and playing back the voice message recorded in the selected channel of the voice memory from the beginning of the message by using the start and end points of the message.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the subject matter of the present invention.

Figure 1:
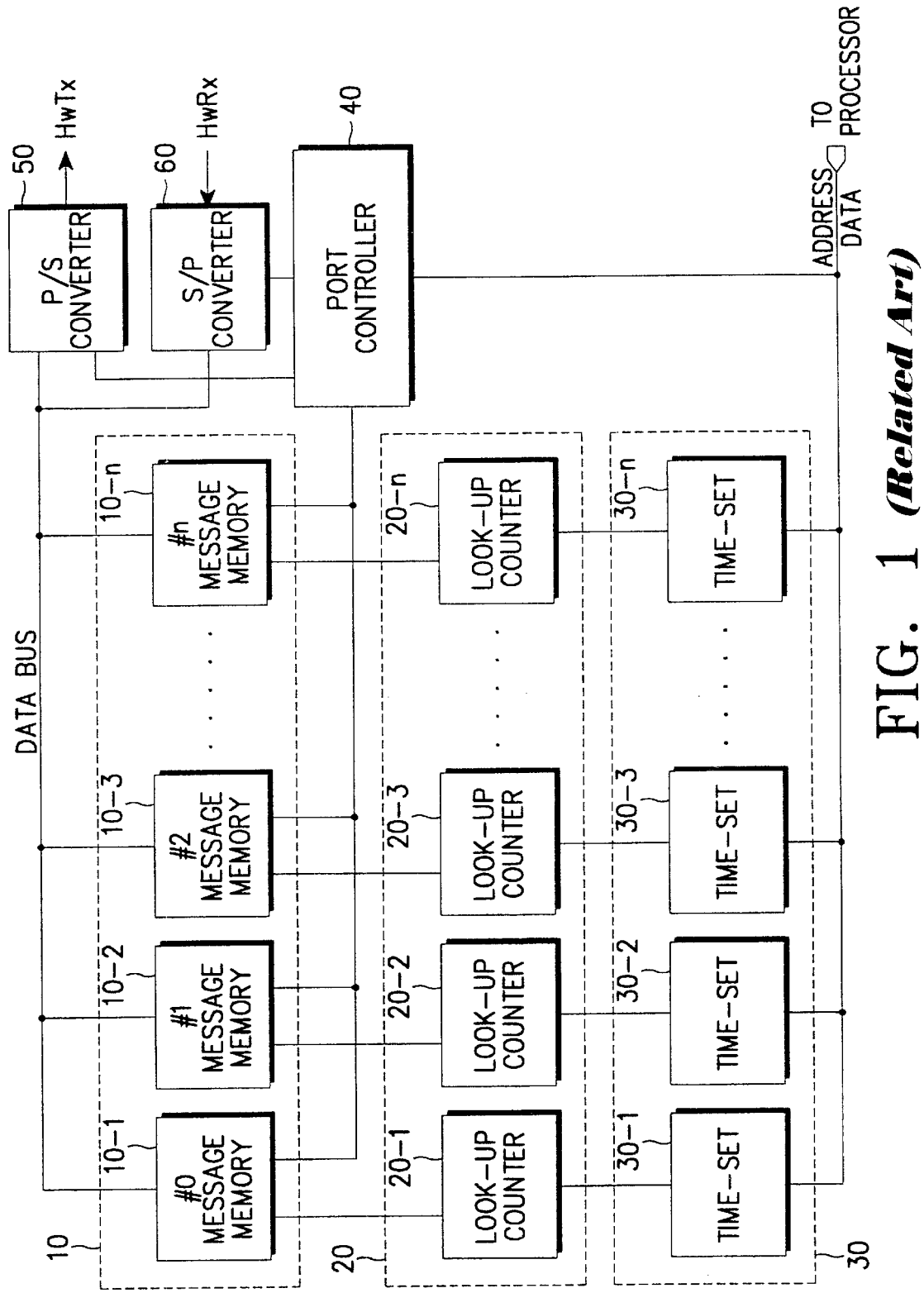
FIG. 1 is a block diagram of an automatic voice announcement apparatus.
Figure 2:
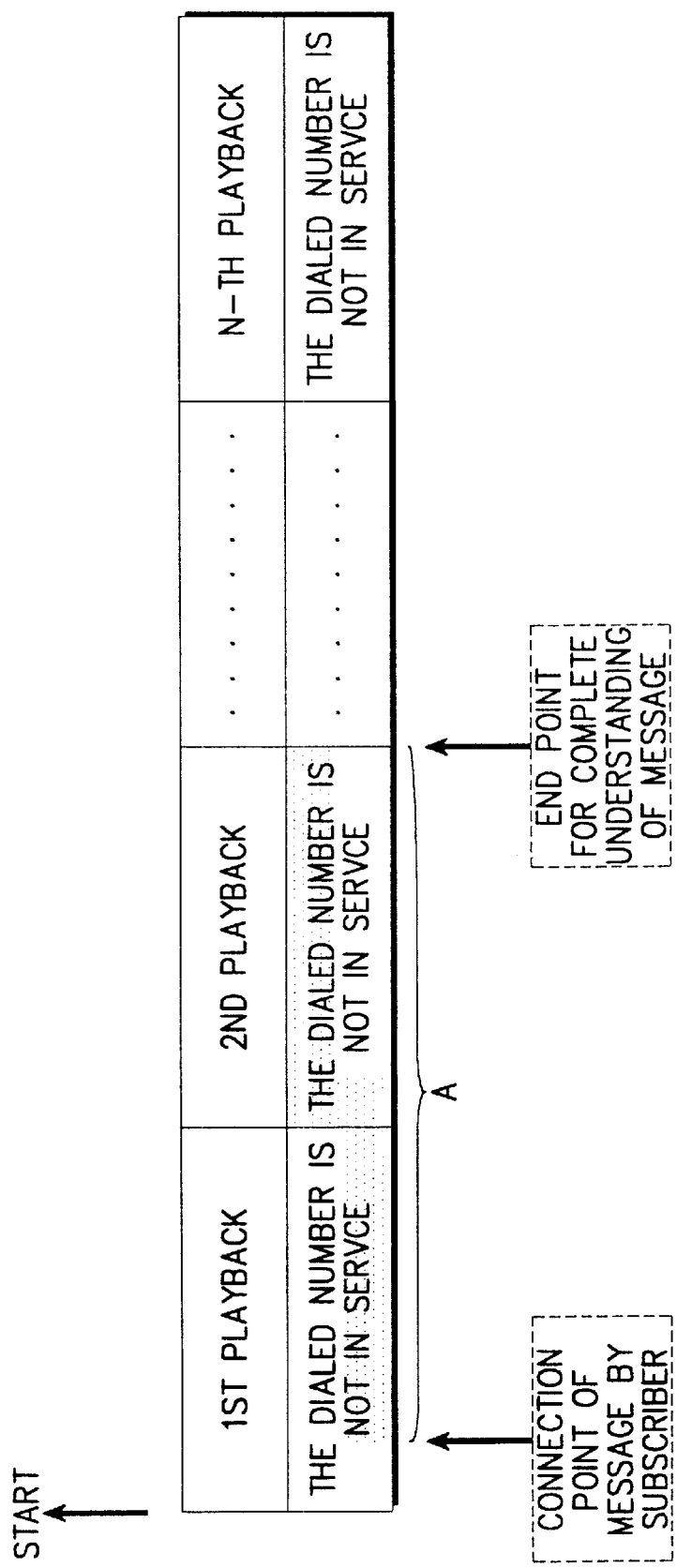
FIG. 2 shows an example of a playback process of an automatic voice announcement message sent from the automatic voice announcement apparatus of FIG. 1.

An automatic voice announcement apparatus is shown in FIG. 1. The automatic voice announcement apparatus includes message memories 10-1, . . . , 10-n, look-up counters 20-1, . . . ,20-n connected respectively to the message memories 10-1, . . . , 10-n, time-set circuits 30-1, . . . ,30-n connected respectively to the look-up counters 20-1,. . . ,20-n, a port controller 40 connected to the message memories 10-1, . . . ,10-n, a serial/parallel (S/P) converter 60, and a parallel/serial (P/S) converter 50. The port controller 40 controls the overall operation during the recording and playback of a voice message. The S/P converter 60 transmits voice data to the message memories 10-1,. . . ,10-n so that the voice message can be sequentially recorded in the message memories 10-1,. . . ,10-n under the control of the port controller 40. The P/S converter 50 transmits the voice data read from the message memories 10-1,. . . ,10-n to a voice transmitter (not shown) under the control of the port controller 40 during the playback of the voice message.

In operation, if there is a voice message recording command from a high-level processor to the port controller 40, the port controller 40 controls the ports of the message memories 10-1,. . . ,10-n so that the voice data input through the S/P converter 60 can be sequentially recorded in the message memories 10-1,. . . ,10-n. Then the voice data input through the S/P converter 60 is recorded in the message memories 10-1, . . . ,10-n. In this case, the look-up counter and the time-set circuit connected to the message memory to be recorded operate to count each address sequentially.

If there is a voice message playback command from the high-level processor to the port controller 40, the port controller 40 plays back the voice data recorded in the message memory through the P/S converter 50. In this case, the look-up counter counts the address of the message memory sequentially. During the playback of the voice message, the end point of the voice message which has been sent to a previous subscriber is stored in the time-set circuit. If a new subscriber is connected, the automatic voice announcement message beginning at the end point (end address) stored in the time-set circuit is sent to him or her. For example, it is assumed that a voice message "THE DIALED NUMBER IS NOT IN SERVICE" is repeatedly recorded in the message memories. If a partial message "THE DIALED NUMBER IS" has been sent to a previous subscriber, the address of the message "THE DIALED NUMBER IS" is stored in the time-set circuit. If a new subscriber is connected, the voice message beginning from "NOT IN SERVICE" is played back. Therefore, the new subscriber must listen to the message once more in order to confirm the entire contents of the announcement message.

Thus, the automatic voice announcement apparatus plays back the automatic voice announcement message not from the beginning of the message but from the end point of the message which has been sent to a previous subscriber. Therefore, the subscriber must repeatedly listen to the message in order to confirm the contents of a complete message. Consequently, the time during which the subscriber is connected to the exchange is lengthened and thus the exchange is inefficiently managed.

An automatic voice announcement apparatus according to the present invention uses a digital signal processor (DSP) to effectively control a memory.

Figure 3:
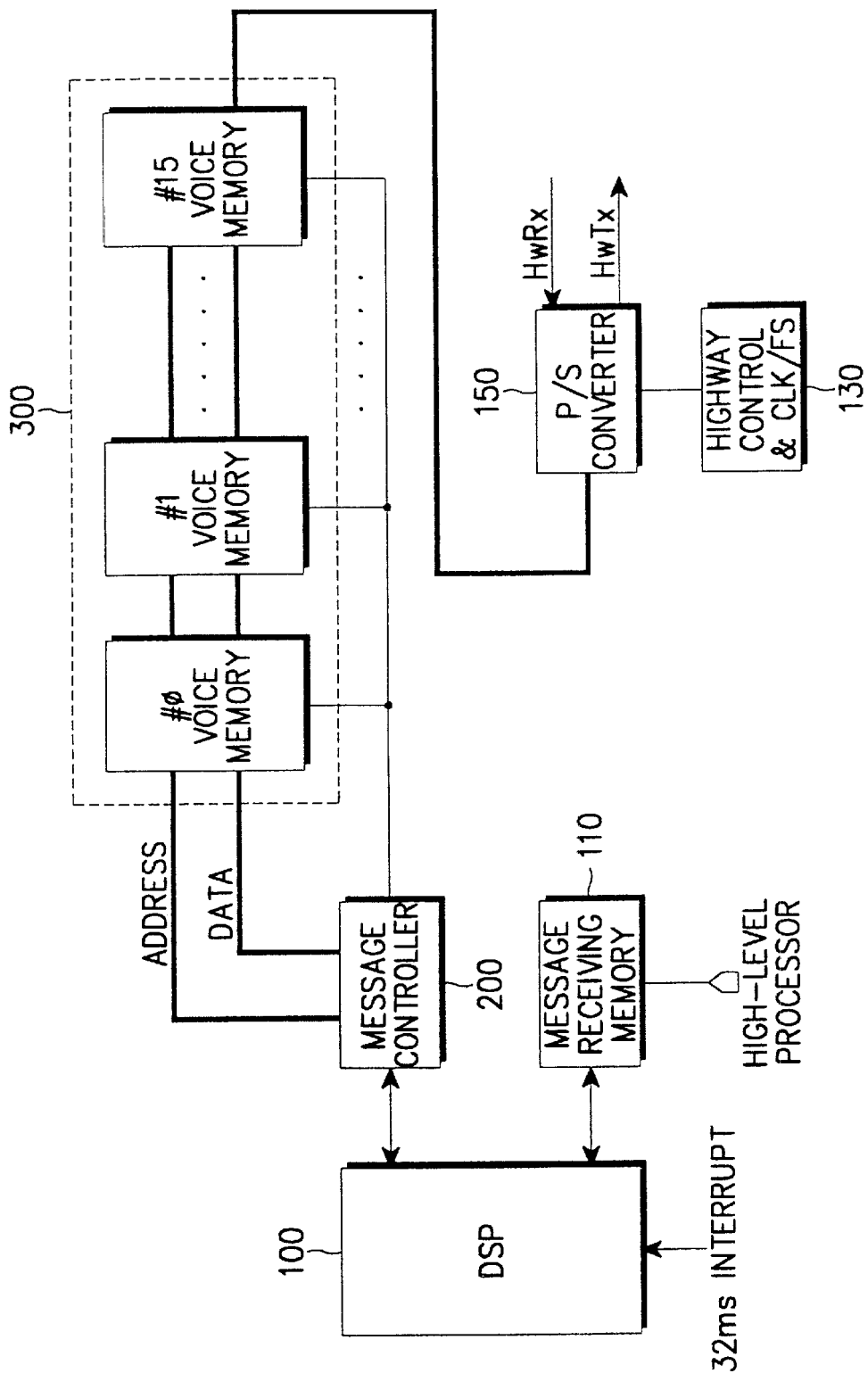
FIG. 3 is a partial block diagram of an automatic voice announcement apparatus according to a preferred embodiment of the present invention.

FIG. 3 is a partial block diagram of the automatic voice announcement apparatus according to the present invention. A message receiving memory 110 receives voice message recording and playback command signals from a high-level processor. A digital signal processor (DSP) 100 receives the voice message recording and playback command signals through the message receiving memory 110 and supplies to a message controller 200 various control signals for recording and playing back a voice message in and from a specific channel of a voice memory 300. The message controller 200 receives a voice message recording control signal from the DSP 1100 to sequentially record the voice message in corresponding areas of the voice memory 300 and receives a voice message playback control signal from the DSP 1100 to play back the voice message by selecting a specific channel of the voice memory 300. The voice memory 300 has a plurality of cards to which a specific channel is assigned. The voice message is stored in one of the channels.

Figure 4:
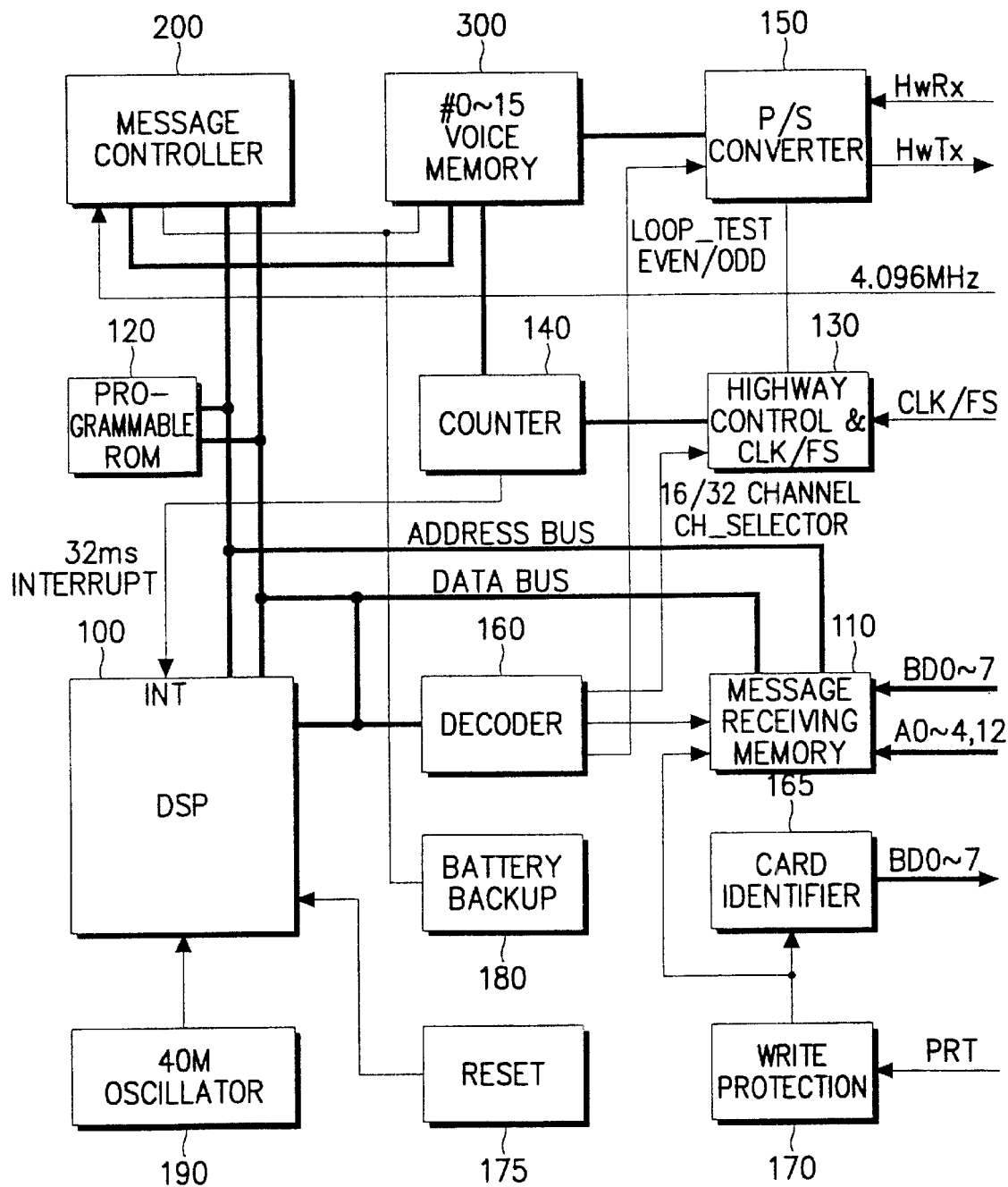
FIG. 4 is a block diagram of an automatic voice announcement apparatus according to a preferred embodiment of the present invention.

The detailed configuration of the automatic voice announcement apparatus is illustrated in FIG. 4.

In recording the voice message, a voice message recording command signal and a specific channel select signal are supplied from the high-level processor to the message receiving memory 110. Then the message receiving memory 110 supplies the voice message recording command signal and the specific channel select signal to the DSP 100 via a data bus and an address bus, respectively. The DSP 100 generates a control signal so that the message controller 200 can select a specific channel of the voice memory 300. Further, the DSP 100 applies a recording command message for recording the voice message in the selected channel to the message controller 200. The recording command message may use an interval of 32 ms. The message controller 200 receiving the recording command message records (writes) the voice message in a corresponding area of the voice message 300 and stores the voice message until the high-level processor transmits a recording end request message. Voice data corresponding to the voice message is stored in the voice memory 300 via a P/S converter 150. A counter 140 counts a voice message recording time and supplies the counted value to the DSP 100. The voice message should be recorded within a predetermined time due to the limited size of the voice memory 300. When the message recording time has elapsed, a maximum value of the size of the voice memory 300 is an end address. The end address is stored in the message controller 200. The DSP 100 can confirm the start and end of the voice message by reading the end address. Thus the voice message is recorded in each memory of the voice memory 300. The recorded voice message must be played back in order to let the subscriber hear it.

In playing back the voice message, if the subscriber is connected to an exchange, a voice message playback command signal and a specific channel select signal are supplied from the high-level processor to the message receiving memory 110. Then the message receiving memory 110 transmits the voice message playback command signal and the specific channel select signal to the DSP 100 via the data bus and the address bus, respectively. The DSP 100 generates a control signal so that the message controller 200 can select a specific channel of the voice memory 300. Further, the DSP 100 applies a voice message playback command message for playing back the voice message recorded in the selected channel to the message controller 200. The message controller 200 plays back the voice message recorded in a corresponding area of the voice message memory 300 until the high-level processor transmits a playback end request message. That is, if the DSP 100 receives the voice message playback command message through the message receiving memory 110, the DSP 100 generates the control signal so that the voice message recorded in the specific channel of the voice message 300 can be played back from the beginning of the message. In this case, the DSP 100 designates a start address to the message controller 200 by reading the start and end points stored in the message controller 200. Then the message controller 200 supplies a control signal for playing back the voice message of a specific channel to the voice memory 300. The voice message stored in a specific channel of the voice memory 300 is sequentially played back through the P/S converter 150.

Thus the voice message is recorded in a specific channel of the voice memory 300 and the start and end points thereof are stored. Therefore, even if the subscriber is disconnected from the exchange while the voice message is played back, the DSP 100 designates the start address corresponding to the beginning of the voice message so that the message controller 200 can play back the voice message from the beginning.

A 40M oscillator 190 supplies a clock to the DSP 100. A decoder 160 selects the P/S converter 150, a highway control and clock/frame synchronizer 130, and the message receiving memory 110. A battery backup circuit 180 is a memory protection power source for protecting the voice message recorded in the voice memory 300 and data of the message controller 200 even when a power source is not supplied to the voice memory 300 and the message controller 200 for a long time. The battery backup circuit 180 may use a Ni-Cd 3.6 V battery. A card identifier 165 causes the high-level processor to identify a card. A write protection circuit 170 causes the high-level processor not to write when the card is pulled out from a system.

Figure 5:
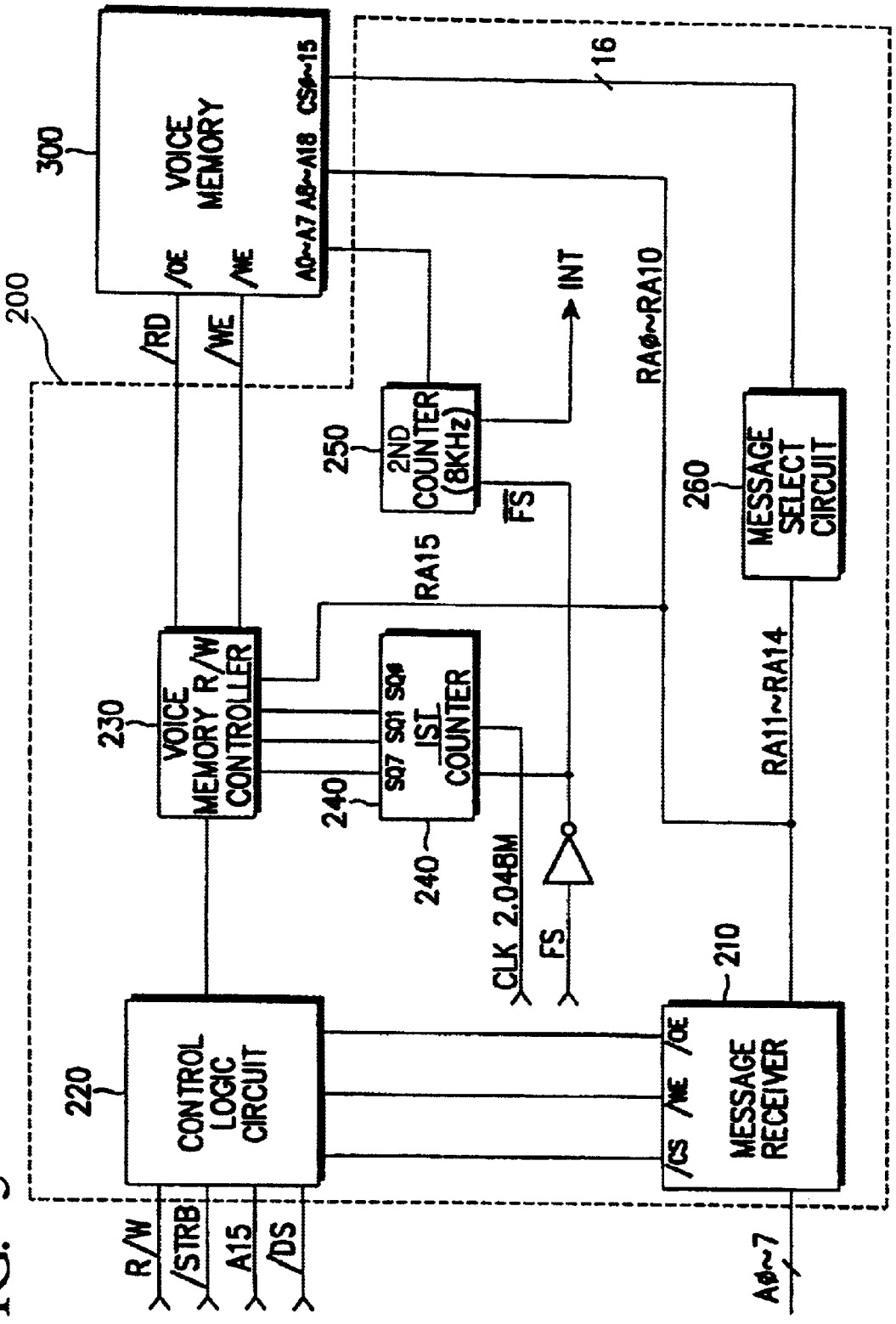
FIG. 5 is a detailed block diagram of a message controller shown in FIG. 4.

The message controller 200 for controlling the voice memory 300 by the control of the DSP 100 is shown in detail in FIG. 5.

Referring to FIG. 5, the message controller 200 includes a message receiver 210 for receiving signals from the DSP 100, a control logic circuit 220 for receiving signals from the DSP 100, a voice memory read/write (recording/playback) controller 230 connected to the control logic circuit 220, a first counter 240 connected to the voice memory read/write controller 230, a second counter 250 connected to the voice memory 300, and a message select circuit 260 connected between the message receiver 210 and the voice memory 300.

Figure 6:
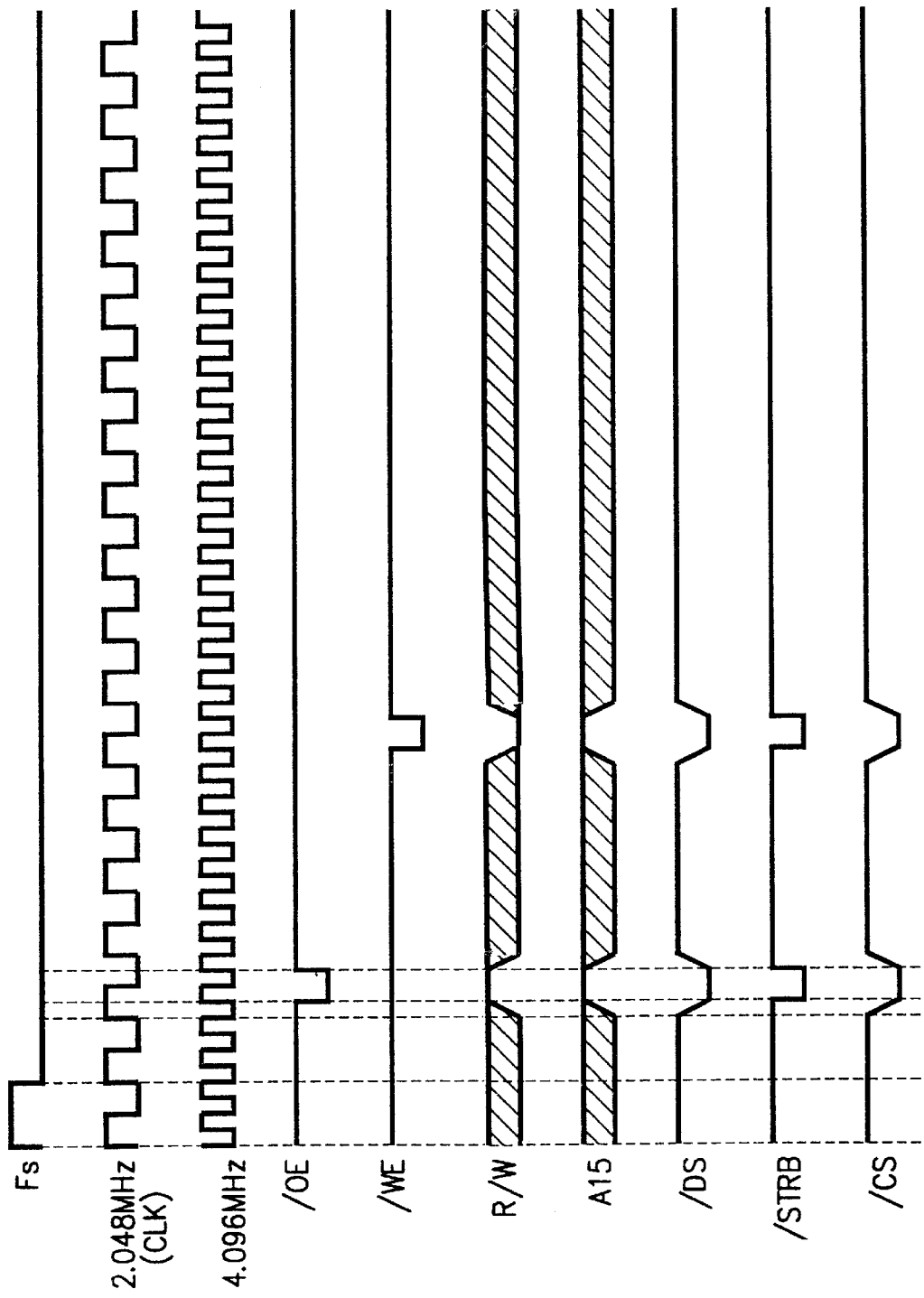
FIG. 6 is a timing chart of signals input to the message controller of FIG. 5.

In operation, signals shown in FIG. 6 are applied to the message controller 200 from the DSP 100. The message receiver 210 receives voice message recording/playback related signals A0–A7 from the DSP 100 and supplies to the message select circuit 260 message select signals RA11–RA14 for assigning channels to the voice memory 300. Then the message select circuit 260 selects a specific channel of the voice memory 300. Message counter signals RA0–RA10 applied to the voice memory 300 are used to send the message by an interrupt signal INT which is supplied to the DSP 100 at intervals of 32 ms from a second counter 250. The controller logic 220 receives signals R/W, /STRB, A15 and /DS from the DSP 100 and supplies output signal values /CS, /WE and /OE to the message receiver 210. The control logic circuit 220 also supplies its output signal to the voice memory read/write controller 230. The voice memory read/write controller 230 receives the output signals of the control logic circuit 220 and a first counter 240 and supplies control signals /RD and /WE for recording and playing back the voice message to the voice memory 300.

The first counter 240 receives a clock signal CLK and a frame synchronizing signal FS from the highway control and clock/frame synchronizer 130 shown in FIG. 4 and supplies a counting output value to the voice memory read/write controller 230 so as to generate the voice message recording and playback control signals. The second counter 250 counts an address of each channel of the voice memory 300 when the voice message is recorded or played back in and from the voice memory 300. If the address is 'FF', the second counter 250 supplies the interrupt signal INT to the DSP 100. The interrupt signal may have a period of 32 ms.

The voice memory 300 operating by the control signals of the message controller 200 consists of 16 static random access memories (SRAMs) for example. Since a 1 M-bit SRAM can store a message for 16 seconds, one card (one channel) can provide services of 16 seconds×16 messages. Since a 4M-bit SRAM can store a message for 64 seconds, if 2 messages are stored, one card can provide services of 32 seconds×32 messages when a DSP firmware program is effectively used.

Figure 7:
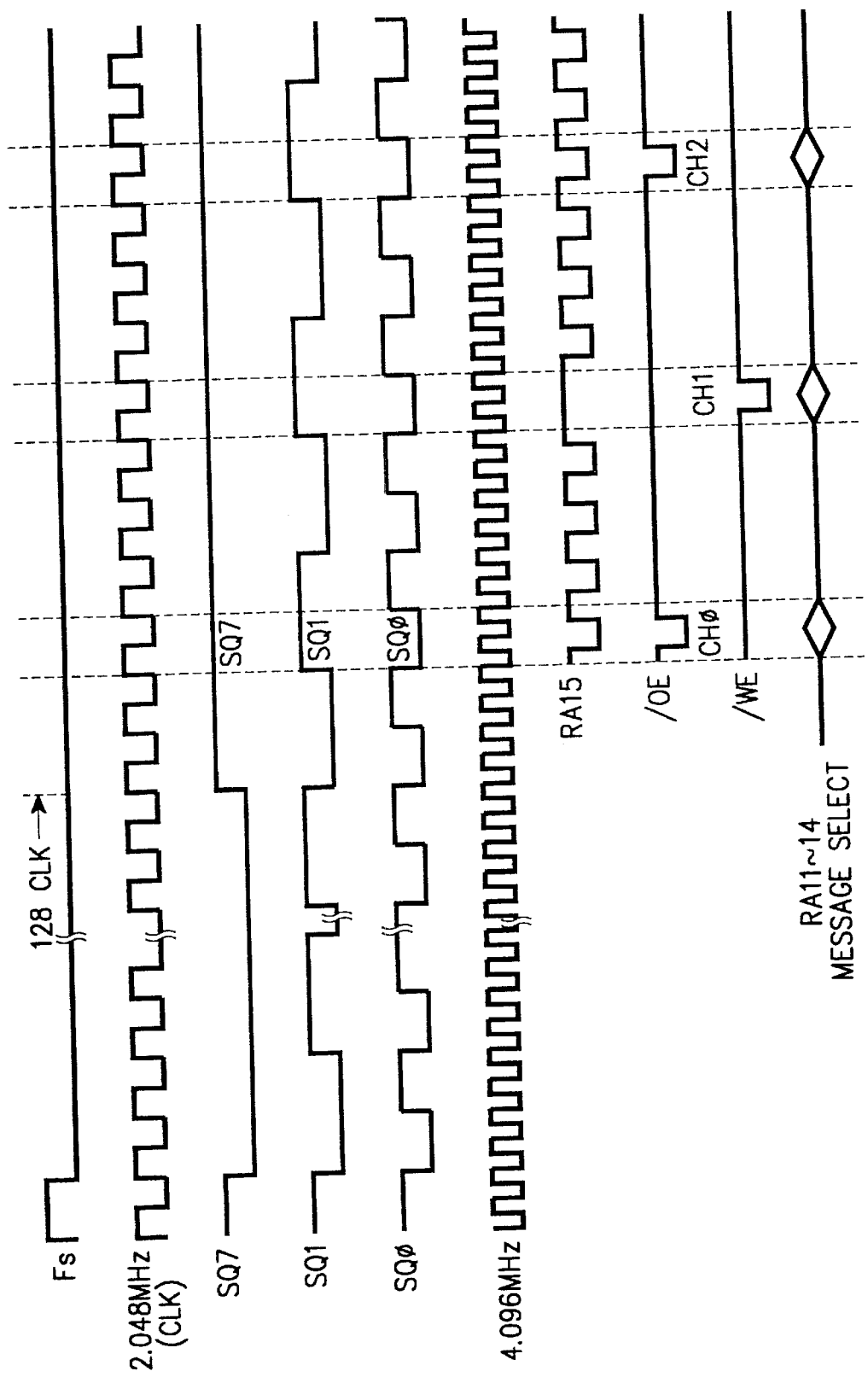
FIG. 7 is a timing chart of signals input to a voice memory shown in FIG. 4.

FIG. 6 is a timing chart of signals applied to the message controller 200 from the DSP 100; FIG. 7 is a timing chart of signals supplied to the voice memory 300; and FIGS. 8A and 8B provide a detailed circuit diagram of the message controller 200.

Figure 8A:
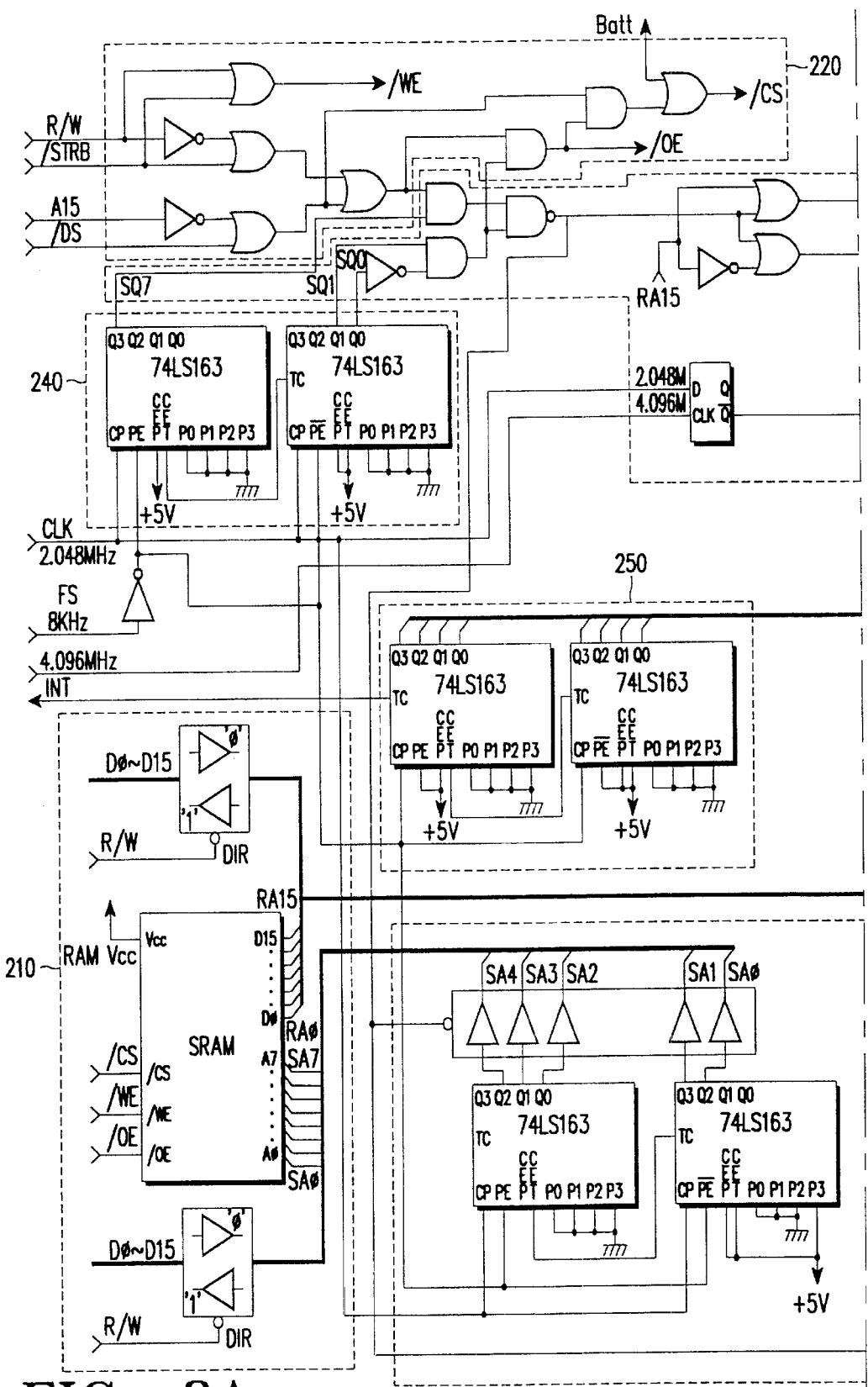
FIGS. 8A and 8B together form a circuit diagram of the message controller of FIG. 5.
Figure 8B:
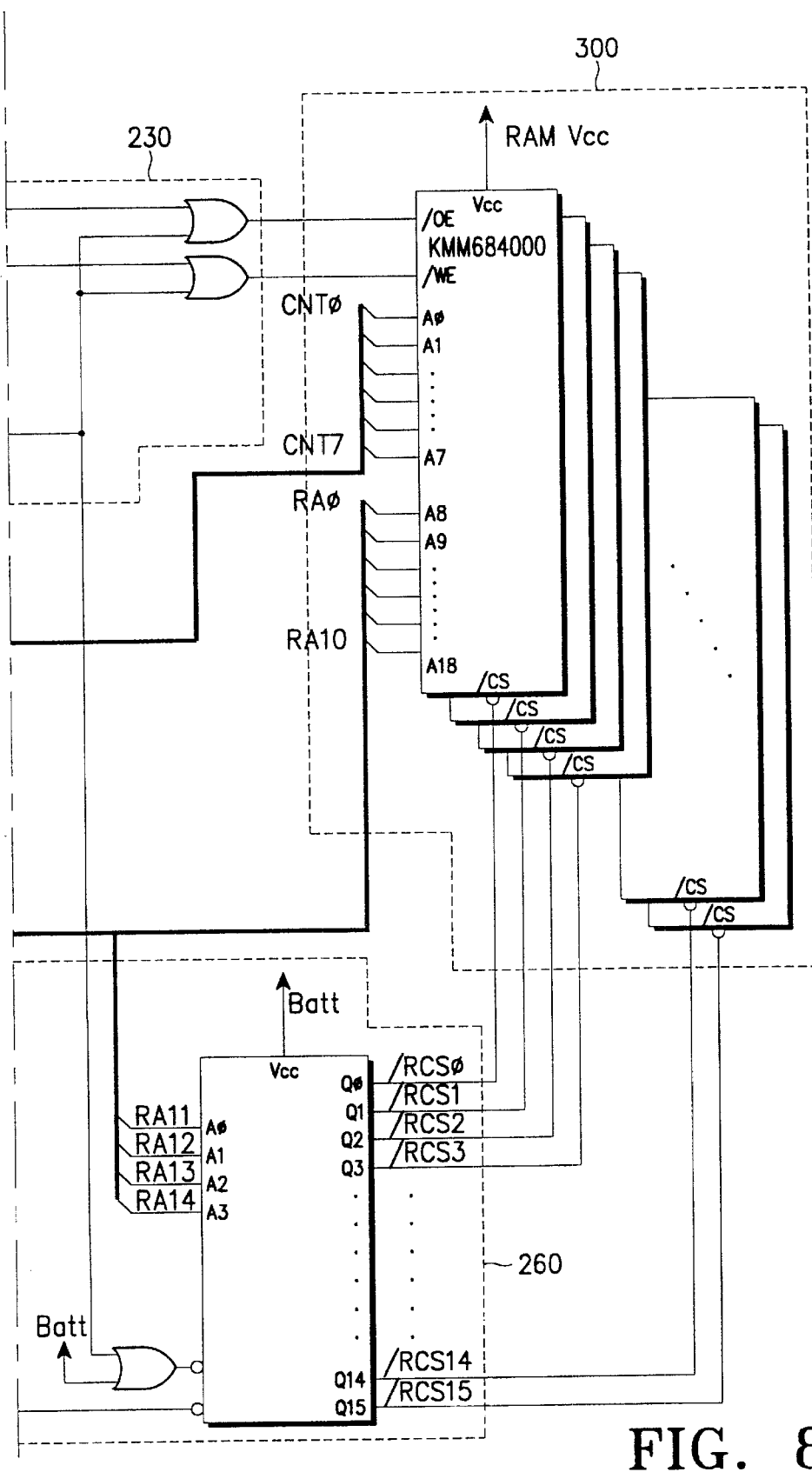

Referring to FIGS. 8A and 8B, the message receiver 210 receives the signals /CS, /WE and /OE from the control logic circuit 220 and supplies voice memory channel select signals RA11–RA14 to the message select circuit 260. The control logic circuit 220 consists of AND gates and OR gates. The voice memory read/write controller 230 connected to the control logic circuit 220 consists of AND gates, OR gates and a D flip-flop, and receives signals SQ0, SQ1 and SQ7 generated from the first counter 240, the output signal of the control logic circuit 220, and a signal RA15. If the signals SQ0, SQ1 and SQ7 are logic "LOW", "HIGH"

and "HIGH", respectively, as shown in FIG. 7, the voice memory read/write controller 230 operates by the signal RA15 and supplies the output signals /OE and /WE to the voice memory 300.

The first counter 240 consists of two 74LS163 chips and receives the clock signal of 2.048 MHZ and the frame synchronizing signal FS of 8 KHz. The first counter 240 uses a driving power source of 5 V. The second counter 250, which is an 8 KHz counter, consists of two 74LS163 chips and uses a driving power source of 5 V. The message select circuit 260 consists of two 74LS163 chips and a SRAM and supplies the channel select signals CS0–CS15 to the voice memory 300.

In order to protect data of the voice memory 300 and data needed in the SRAM of the message controller 200 even if the power source is turned off or the card is pulled out from the system, the battery backup circuit is connected to the SRAM.

As described above, if the subscriber is connected to the exchange, an automatic voice announcement message is sent to the subscriber from the beginning of the message. Therefore, the time occupied by the subscriber is shortened and the automatic voice announcement apparatus is effectively controlled. The automatic voice announcement apparatus according to the present invention may provide various services and be applied to a voice mail system, a paging system, a PCS (Personal Communication System), a CDMA (Code Division Multiplex Access) system, etc.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An automatic voice announcement apparatus for sending an automatic voice announcement message to a subscriber connected to an exchange from the beginning of the message, said apparatus comprising:

a message receiving memory for receiving voice message recording and playback control signals from a high-level processor;

a digital signal processor for receiving said voice message recording and playback control signals from said message receiving memory, and for generating control signals for recording and playing back the voice announcement message in response to said voice message recording and playback control signals;

a voice memory containing a plurality of cards each having at least one assigned channel, the voice announcement message being stored in a memory area corresponding to a specific channel selected among said plurality of channels; and a message controller for sequentially recording the voice announcement message in said corresponding memory area of said voice memory in response to the voice message recording control signal from said digital signal processor, and for playing back the voice announcement message from the beginning of the message, without clipping said voice announcement message, by selecting said specific channel in response to the voice message playback control signal from said digital signal processor.

2. The automatic voice announcement apparatus as claimed in claim 1, said message controller comprising:

a message receiver for generating a channel select control signal so as to select a specific voice message stored in said voice memory;

a control logic circuit for supplying a corresponding signal to said voice memory according to a command from said digital signal processor;

a first counter for generating a counting output value in response to a clock signal and a frame synchronizing signal from said digital signal processor;

a second counter for counting an address when the voice announcement message is recorded and played back in and from said voice memory, and for supplying an interrupt signal to said digital signal processor;

a voice memory read/write controller for receiving signals from said control logic circuit and said first counter and for generating voice message recording and playback control signals; and a message select circuit for receiving said channel select control signal from said message receiver and for selecting a specific channel of said voice memory.

3. A method of controlling an automatic voice announcement message in an automatic voice announcement apparatus of an exchange including a message receiving memory, a digital signal processor, a message controller, and a voice memory consisting of a plurality of channels, said method comprising the steps of:

applying voice message recording and playback command signals received from a high-level processor to said digital signal processor;

generating voice message recording and playback control signals in response to said recording and playback command signals;

converting the voice announcement message to parallel format and transmitting said voice announcement message to a specific channel of said voice memory;

recording said voice announcement message via said specific channel in one of a plurality of cards contained in said voice memory in response to said voice message recording control signal;

counting a recording time of the voice announcement message and storing start and end points of the voice announcement message;

recording a plurality of voice announcement messages in said cards via different channels of said voice memory and storing start and end points of the respective voice announcement messages; and playing back one of the voice announcement messages recorded in cards of said voice memory from the beginning of the voice announcement message, without clipping said voice announcement message, by using the start and end points of the message.

4. A method of controlling an automatic voice announcement apparatus of an exchange which includes a digital signal processor, and a voice memory consisting of a plurality of channels for storing an automatic voice announcement message, said method comprising the steps of:

generating a first control signal for recording a voice announcement message in at least one of a plurality of memory cards contained in said voice memory via a specific channel of said voice memory in response to a recording command signal from a high-level processor;

converting the voice announcement message to parallel format and transmitting said voice announcement message via said specific channel of said voice memory;

recording the voice announcement message in a corresponding one of said memory cards of said voice memory until a recording end request message is received from said high-level processor, in response to said first control signal;

counting recording start and end points of the voice announcement message;

storing a recorded channel, and storing the recording start and end points of the voice announcement message as start and end addresses;

selecting one of said channels of said voice memory in response to a voice message playback command signal from said high-level processor;

generating a second control signal for sequentially playing back the voice announcement message recorded in the memory card corresponding to the selected channel for playback from the start point of the voice announcement message; and sequentially playing back the voice announcement message from the start point to the end point in response to said second control signal without clipping said voice announcement message.

\* \* \* \* \*